United States Patent
Luizink et al.

(10) Patent No.: US 6,243,525 B1
(45) Date of Patent: Jun. 5, 2001

(54) OPTICAL WAVEGUIDE DEVICE COMPRISING AT LEAST ONE BENT WAVEGUIDE CHANNEL

(75) Inventors: Miriam Luizink, Den Haag; Tsjerk Hans Hoekstra, Dieren; Bernardus Hendricus Maria Hams, Delden; Franciscus Martinus Maria Suijten, Elst, all of (NL)

(73) Assignee: JDS Uniphase Photonics C.V., Arnhem (NL)

( * ) Notice: Subject to any disclaimer, the term of this patent is extended or adjusted under 35 U.S.C. 154(b) by 0 days.

(21) Appl. No.: 09/252,594

(22) Filed: Feb. 12, 1999

(30) Foreign Application Priority Data

Feb. 13, 1998 (EP) .................................. 98200453

(51) Int. Cl.$^7$ ........................................ G02B 6/10
(52) U.S. Cl. ................................. 385/132; 385/131
(58) Field of Search ................. 385/2, 11, 16, 385/46, 130, 129, 128, 131, 132

(56) References Cited

U.S. PATENT DOCUMENTS

| | | | |
|---|---|---|---|
| 5,857,039 | 1/1999 | Bosc et al. | 385/14 |
| 5,963,701 | * 10/1999 | Nakamura et al. | 385/128 X |

FOREIGN PATENT DOCUMENTS

| | | |
|---|---|---|
| 3804330 | 8/1989 | (DE) . |
| 0 281 800 | 9/1988 | (EP) . |
| 0 347 233 | 12/1989 | (EP) . |
| 0 365 724 | 5/1990 | (EP) . |
| 0 797 113 A1 | 9/1997 | (EP) . |
| 07178825 | 7/1995 | (JP) . |
| WO97/01782 | 1/1997 | (WO) . |

OTHER PUBLICATIONS

A Normalized Approach to the Design of Low–Loss Optical Waveguide Bends, Smit et al., J. of Lightwave Tech., 11:11, pp. 1737–1742 (11/93).

Solid State Optical Space Switches for Network Cross–Connect and Protection Applications, Tumolillo, et al., IEEE Comm.Mag., pp.124–130 (2/97).

Polymeric phased array wavelength mulltiplexer operating arround 1550nm, Diemeer et al., Electronics Letters, 32:12, pp. 1132–1133, (Jun. 6, 1996).

Novel "serially grafted" connection between functional and passive polymer waveguides, Watanabe et al., Appl. Phys. Lett., 65:10, pp. 1205–1207 (Sep. 5, 1994).

Graded–Effective–Index Waveguiding Structures Fabricated with Laser Processing, Ruberto et al., SPIE 1215 pp. 538–557 (1990).

* cited by examiner

Primary Examiner—Phan T. H. Palmer
(74) Attorney, Agent, or Firm—Dilworth & Barrese, LLP

(57) ABSTRACT

The invention pertains to a polymeric optical waveguide device, such as an optical switch, splitter, phased array, Mach Zehnder interferometer, or the like, comprising at least one polymer waveguide channel embedded in a polymer cladding, said waveguide channel having a refractive index higher than that of the cladding and comprising at least one bend or curved section at least part of which has a refractive index contrast higher than that in the rest of the waveguide channel. The devices according to the invention are relatively compact.

20 Claims, 1 Drawing Sheet

OPTICAL WAVEGUIDE DEVICE COMPRISING AT LEAST ONE BENT WAVEGUIDE CHANNEL

BACKGROUND OF THE INVENTION

The invention pertains to a (planar) polymeric optical waveguide device, such as an optical switch, splitter, phased array, Mach Zehnder interferometer (MZI), or the like, comprising at least one polymer waveguide channel embedded in a polymer cladding, said waveguide channel having a refractive index $n_2$ higher than that of the cladding $n_1$ and comprising at least one bend or curved section 10.

Bends are used to change the propagation direction of a mode or to reach a certain offset. For example, in optical 1×2 switches like those disclosed in G. F. Lipscomb et al., "Packaged thermo-optic polymer 1×2 switch," Conference on Optical Fiber Communication (OFC'95), San Diego, *Technical Digest,* Vol. 8 (Feb. 25, 1995), pp. 221–222, bends are needed to obtain a final output pitch or separation larger than 125 μm between the two output channels required for the attachment of standard single mode glass fibres.

Unfortunately, small bend radii cannot be selected at will, because small radii (i.e., sharp bends) result in high loss through the conversion of guided modes into radiation modes. As a result, such optical waveguide devices cannot be made as compact as is often required (for technical or commercial reasons), especially when the devices comprise several bent waveguides and/or waveguides containing a plurality of bends (e.g., S-bends).

SUMMARY OF THE INVENTION

It is an object of the present invention to reduce the size of optical waveguide devices comprising bends or curved sections and to reduce so-called bending losses. This object is achieved by employing a bend or curved section in which at least part, preferably all of the bend or curved section 10 has a refractive index contrast higher than that in the rest of the waveguide channel. Preferably the bend or curved section which has a higher refractive index contrast is serially grafted.

DESCRIPTION OF THE PREFERRED EMBODIMENTS

Figure 1:
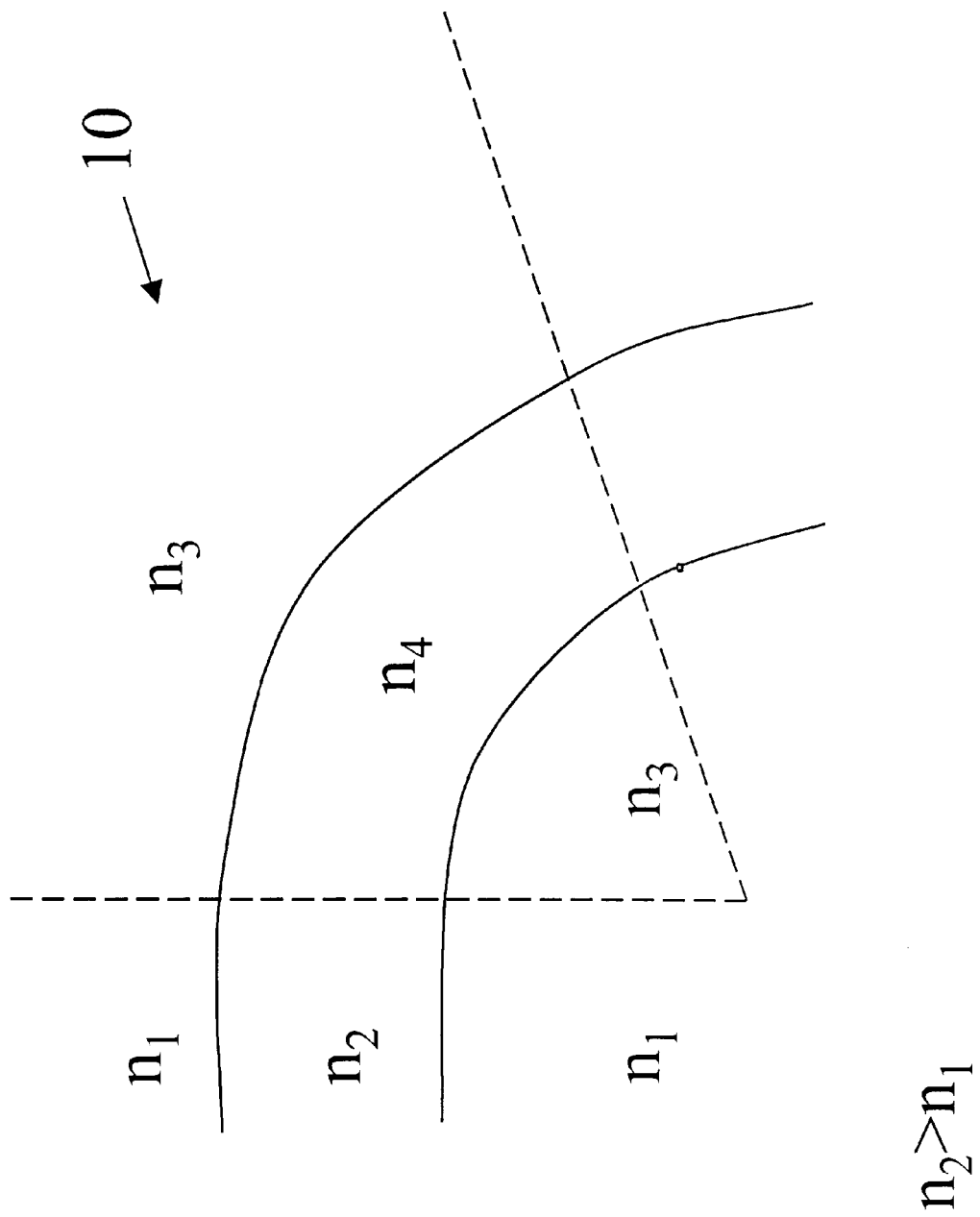
FIG. 1 is a schematic diagram of an optical waveguide device comprising at least one bent waveguide channel in accordance with the instant invention.

It was found that the use of relatively high refractive index polymers in the bends or relatively low refractive index polymers in the cladding around the bends allows for very small radii: for certain materials and wavelengths even radii smaller than 1 mm are possible. Surprisingly, it also appeared that in the polymer devices according to the present invention the bending losses decrease (up to a certain point) with a decreasing radius. Another advantage of the present invention resides in that the remaining straight waveguide channels need not be affected and can be optimised for other purposes, e.g., waveguide to fibre coupling, which requires a waveguide channel having a relatively low refractive index.

It is preferred that the difference between the refractive index contrast in the bend or curved section is at least 0.002 greater than that in the rest of the waveguide channel. For instance, with a refractive index contrast in the straight sections of the waveguide in the range from 0.003 to 0.005, the contrast in the bend or bends is preferably at least 0.005 (or at least 0.007), e.g., 0.01. It is further preferred that the waveguide channel or channels are single mode and the contrast in straight-bend transition is such that the channel will not become multi mode in the bend or curved section.

Polymers are available in virtually every relevant refractive index and make for comparatively simple manufacture of integrated optical devices. Further, polymers are very suitable for use in active optical components such as thermo-optical (digital) switches, MZIs, and the like, since even a modest temperature change can give rise to a major change in refractive index.

As was mentioned above, the present invention enables the use of bends with a very small bending radius. Bends having a radius between 0.3 and 50 mm are preferred. Bends having a radius of between 1 and 20 mm, and preferably between 3 and 10 mm, especially combine compactness on the one hand and very small bending losses on the other.

The advantages of the present invention also apply in the realisation of bends which are designed to operate in the whispering gallery mode regime. For more details on the whispering gallery mode regime reference may be had to M. K. Smit, "A Normalized Approach to the Design of Low-Loss Optical Waveguide Bends," *Journal of Lightwave Technology,* Vol. 11 (1993), pp. 1737–1742.

Devices according to the invention can be used with advantage in optical communications networks of various kinds. Generally, the optical components either will be directly combined with optical components such as light sources (laser diodes) or detectors, or they will be coupled to input and output optical fibres, usually glass fibres.

Polymer optical devices are commonly optical fibre-compatible and based on embedded or embedded ridge-type channel waveguides. The resulting structure comprises a high refractive index core polymer (usually of rectangular or square cross-section) embedded in a lower refractive index cladding material. In accordance with the present invention, it is preferred that at least part of the core polymer in the bends has a refractive index contrast higher than that in the rest of the core polymer.

The polymer waveguide structures according to the present invention are preferably manufactured using a grafting process which at least comprises the following steps: 1) applying a first core layer onto a substrate, e.g., onto a silicon wafer provided with a lower cladding, 2) shaping this first core layer, e.g., by means of reactive ion etching (RIE), thus realising the waveguides and the parts of the waveguides which are to be grafted, i.e., at least part of the bend, 3) either applying a second core layer, which serves to form the remaining parts of the core, or applying a cladding, 4) applying a planarisation layer onto the second core layer or the cladding respectively, and 5) back-etching the planarisation layer and the second core layer to the desired height of the waveguide. As of step 2 two routes are possible: either a second core layer is applied, in which case a serially grafted core is obtained, or a cladding is applied, in which case the cladding needs to be grafted later on.

The planarisation layer should exhibit an etching rate (for the etching process used) which is substantially equal to the etching rate of the second core layer and should have good planarisation properties, especially a low Tg (preferably lower than room temperature, i.e., below 25° C. ). After back-etching, the layer stack has a very flat and regular top surface which forms a very sound basis for further process steps, such as applying one or more top cladding layers and, in the case of an active optical device, electrodes or heating elements.

The etching rate of the planarisation layer can be very conveniently matched to the etching rate of the second core layer or the cladding by means of an additive to the planarization layer. It preferred that the additive comprises an aromatic moiety, because aromatic moieties effectively increase the resistance to etching processes.

Further details on grafting can be found, e.g., in T. Watanabe et al., "Novel 'serially grafted' connection between functional and passive polymer waveguides," *Appl. Phys. Lett.* 65 (10), Sep. 5, 1994, pp. 1205–1207.

Suitable materials for and configurations of the cladding and the core layers are, int. al., disclosed in M. B. J. Diemeer et al., "Polymeric phased array wavelength multiplexer operating around 1550 nm," *Electronics Letters*, Vol. 32 (1996), pp. 1132–1133; and T. A. Tumolillo et al., "Solid State Optical Space Switches for Network Cross-Connect and Protection Applications," *IEEE Communications Magazine* (1997), pp 124–130; and International Patent Application WO 97/01782.

It should be noted that in M. N. Ruberto et al., "Graded-Effective-Index Waveguiding Structures Fabricated with Laser Processing," SPIE Vol. 1215 *Digital Optical Computing II* (1990), pp. 538–556, a rib-like bent waveguide on GaAs/AlGaAs material is disclosed which is provided with a slightly deeper groove on the outside bend than on the inside bend. Thus, the radiation losses in the bend are reduced. Ruberto et al. does not relate to the optical fibre-compatible structures of the present invention in that confinement of the mode is achieved by providing grooves on either side of the designated waveguiding area. In such structures, mode size is extremely small and asymmetric, resulting in unacceptably high fibre chip losses. Further, the grooves prohibit the deposition of electrodes or heaters which are necessary in active components such as switches and MZIs. A core waveguide channel embedded in a cladding of a different material is not mentioned either explicitly or implicitly. In fact, the use of grooves in such structures could severely distort the waveguiding structure, because they would release the internal stress which is usually present in composite structures.

A similar device is disclosed in Japanese patent application JP07178825, which also describes a groove for loss reduction of an optical signal at the bend part of an optical waveguide. The groove is formed adjacent to the outside of the bend part and is filled with a gas having a refractive index lower than that of the waveguide core part and also than that of the waveguide clad part. The devices according to JP07178825 also exhibit the above-mentioned disadvantages resulting from the use of a groove.

A further device with substantially the same disadvantages is known from German patent application DE 38 04 330. However, this publication is not concerned with reducing bending losses but, instead, with reducing transition losses.

A technique for varying refractive indices of core and/or cladding of silicate glass waveguide structures by means of a laser beam is known from EP 281 800. This technique is not suitable for use in polymeric optical devices.

Within the framework of the present invention, the refractive index contrast is defined as the difference between the refractive index of the waveguide channel and the refractive index of the cladding.

The invention will be illustrated by way of an unlimitative example below.

EXAMPLE

Six pairs of devices comprising a core (width: 6 μm) with a S-bend (offset; 125 μm) were built by means of conventional spin-coating and reactive ion etching. Each pair had a bending radius different from the others. The devices in each pair were identical except for the fact that one was grafted in accordance with the present invention, whereas the refractive index contrast in the other, serving as control, was constant in each part of the core.

For the cladding a polymer having a low refractive index (at 1536 nm) of 1.5110 was used. The core was prepared from a polymer having a refractive index of 1.5170 (contrast 0.0060). The devices in accordance with the present invention were provided with S-bends of a polymer having a refractive index of 1.5198 (contrast 0.0088) by means of the grafting method described above.

The excess loss was measured on each of these devices at signal wavelengths ('$\lambda$') of 1330 and 1536 nm. "Excess loss" is defined as the additional loss relative to a straight waveguide channel with the same refractive index as the control devices and is expressed in "dB." In the Tables below, the results of the measurements are shown. "R" denotes the radius of the two bends in each S-bend and is expressed in mm.

TABLE 1

($\lambda$ = 1536 nm)

| R in mm | Invention Excess loss in dB | Control Excess loss in dB |
| --- | --- | --- |
| 50 | 1.15 | 1.00 |
| 20 | 1.53 | 1.38 |
| 15 | 1.02 | 1.88 |
| 10 | 1.12 | 3.78 |
| 7 | 1.01 | 3.72 |
| 4 | 1.03 | 6.31 |

TABLE 2

($\lambda$ = 1330 nm)

| R in mm | Invention Excess loss in dB | Control Excess loss in dB |
| --- | --- | --- |
| 50 | 1.12 | 1.07 |
| 20 | 1.26 | 1.16 |
| 15 | 1.46 | 0.89 |
| 10 | 0.79 | 1.82 |
| 7 | 0.71 | 1.83 |
| 4 | 0.35 | 3.65 |

These examples clearly show that, compared to devices comprising S-bends having a (relatively) low refractive index contrast, a (relatively) high refractive index contrast in the grafted S-bends enables the use of very small bending radii. Moreover, whereas losses in the control S-bends increase with a decreasing bending radius, the losses in the S-bends according to the present invention quite surprisingly appear (to a certain extent) to decrease with decreasing bending radius.

Depending on the wavelength, the losses in the grafted bends stay below a constant acceptable value at radii ranging from 50 to 1 mm.

What is claimed is:

1. An optical waveguide device comprising at least one polymer waveguide channel comprising a polymer core embedded in a polymer cladding, said core having a refractive index higher than that of the cladding and said waveguide channel comprising at least one bend or curved section, wherein at least part of the bend or curved section has a refractive index contrast higher than that in the rest of the waveguide channel.

2. Optical waveguide device according to claim 1 wherein the difference between the refractive index contrast in the bend or curved section and that in the rest of the waveguide channel is greater than 0.002.

3. Optical waveguide device according to claim 2, wherein the bend or curved section which has a refractive index contrast higher is serially grafted.

4. Optical waveguide device according to claim 2, wherein the bend has a radius between 1 and 8 mm.

5. Optical waveguide device according to claim 2 wherein the bend or bends are designed to operate in the whispering gallery mode regime.

6. Optical waveguide device according to claim 2 wherein at least part of the polymer in the bend or curved section has a refractive index higher then that in the rest of the waveguide channel.

7. Optical waveguide device according to claim 1, wherein the bend or curved section which has a refractive index contrast higher is serially grafted.

8. Optical waveguide device according to claim 7, wherein the bend has a radius between 1 and 8 mm.

9. Optical waveguide device according to claim 7, wherein the bend or bends are designed to operate in the whispering gallery mode regime.

10. Optical waveguide device according to claim 7, wherein at least part of the polymer in the bend or curved section has a refractive index higher then that in the rest of the waveguide channel.

11. Optical waveguide device according to claim 1 wherein the bend has a radius between 1 and 8 mm.

12. Optical waveguide device according to claim 11, wherein the bend or bends are designed to operate in the whispering gallery mode regime.

13. Optical waveguide device according to claim 11, wherein at least part of the polymer in the bend or curved section has a refractive index higher then that in the rest of the waveguide channel.

14. Optical waveguide device according to claim 1 wherein the bend or bends are designed to operate in the whispering gallery mode regime.

15. Optical waveguide device according to claim 1 wherein at least part of the polymer in the bend or curved section has a refractive index higher than that in the rest of the waveguide channel.

16. Method for making the device according to any one of the preceding claims, which method at least comprises the following steps:

applying a first core layer onto a substrate, shaping this first core layer, thus realising at least one waveguide channel and the parts of the core which are to be grafted, either applying a second core layer, which serves to form the remaining parts of the waveguide structure, or a cladding layer, applying a planarization layer over the second core layer or over the cladding, back-etching the planarization layer and the second core layer or the cladding, respectively, to the desired height of the waveguide, the planarization layer having an etching rate which is substantially equal to the etching rate of the second core layer or the cladding.

17. Method according to claim 7 wherein the material forming the planarisation layer is a polymer having a glass transition temperature below 25° C.

18. Method according to claim 17 wherein the etching rate of the second core layer or the cladding is matched to the etching rate of the planarization layer by means of a additive to the second core layer or the cladding.

19. Method according to claim 7 wherein the etching rate of the second core layer or the cladding is matched to the etching rate of the planarization layer by means of an additive to the second core layer or the cladding.

20. Method according to claim 9 wherein the additive comprises an aromatic moiety.

* * * * *